US009979714B2

(12) United States Patent
Rajaram et al.

(10) Patent No.: US 9,979,714 B2
(45) Date of Patent: *May 22, 2018

(54) AUTHENTICATING A PERSONA IN A SOCIAL NETWORKING SYSTEM

(71) Applicant: Facebook, Inc., Menlo Park, CA (US)

(72) Inventors: Giridhar Rajaram, Cupertino, CA (US); Gang Wu, Millbrae, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/237,499

(22) Filed: Aug. 15, 2016

(65) Prior Publication Data
US 2016/0359835 A1 Dec. 8, 2016

Related U.S. Application Data

(63) Continuation of application No. 13/681,414, filed on Nov. 19, 2012, now Pat. No. 9,443,273.

(51) Int. Cl.
G06F 15/16 (2006.01)
H04L 29/06 (2006.01)
G06Q 50/00 (2012.01)
G06F 17/30 (2006.01)
H04L 12/58 (2006.01)

(52) U.S. Cl.
CPC ........ H04L 63/08 (2013.01); G06F 17/30864 (2013.01); G06Q 50/01 (2013.01); H04L 51/32 (2013.01); H04L 63/126 (2013.01)

(58) Field of Classification Search
CPC ....... H04L 63/08; H04L 51/32; H04L 63/126; G06F 17/30864; G06Q 50/01
See application file for complete search history.

(56) References Cited

U.S. PATENT DOCUMENTS

| 8,225,413 | B1* | 7/2012 | De | G06F 21/6245 726/22 |
|---|---|---|---|---|
| 2006/0004891 | A1* | 1/2006 | Hurst-Hiller | G06F 17/30646 |
| 2009/0055476 | A1* | 2/2009 | Markus | G06Q 10/00 709/204 |
| 2011/0004850 | A1* | 1/2011 | Lodico | G06Q 30/02 715/838 |
| 2011/0145435 | A1* | 6/2011 | Bhatawdekar | G06F 21/566 709/238 |

(Continued)

Primary Examiner — Philip Chea
Assistant Examiner — Wuji Chen
(74) Attorney, Agent, or Firm — Fenwick & West LLP

(57) ABSTRACT

A social networking system provides access to personas comprising information, for example, web pages describing users or entities. The information may be suggested by the social networking system or requested by the user, for example, via search. The social networking system authenticates the personas so that only authentic personas are suggested to users or returned when a user is searching for information. The authenticity of a persona is determined based on the connections and/or likes coming from other personas, user accounts, or other entities represented within the social networking system that have been previously authenticated. The authenticity of the person is also determined based on external links to the persona, for example, external websites referring to the persona or the rate at which external systems such as search engines direct web traffic to the persona.

18 Claims, 6 Drawing Sheets

(56) References Cited

U.S. PATENT DOCUMENTS

| | | | |
|---|---|---|---|
| 2011/0252121 A1* | 10/2011 | Borgs | G06F 17/30867 709/223 |
| 2012/0066203 A1* | 3/2012 | Robert | G06F 17/30864 707/711 |
| 2012/0072475 A1* | 3/2012 | Morrison | G06F 17/10 708/200 |
| 2013/0066730 A1* | 3/2013 | Myslinski | G06Q 10/10 705/14.73 |
| 2014/0143825 A1* | 5/2014 | Behrendt | G06F 21/552 726/1 |
| 2016/0055490 A1* | 2/2016 | Keren | G06Q 30/00 705/14.47 |

* cited by examiner

AUTHENTICATING A PERSONA IN A SOCIAL NETWORKING SYSTEM

CROSS REFERENCE TO RELATED APPLICATIONS

This is application is a continuation of U.S. application Ser. No. 13/681,414, filed Nov. 19, 2012. The foregoing application is incorporated by reference in its entirety.

BACKGROUND

This invention relates to authentication of entities represented in social networking systems in general and in particular to authenticating a persona in a social networking system.

Social networking systems store user profile information provided by users including but not limited to hometown, current city, education history, employment history, photos, and events the user participated in the user's profile. Users utilize social networking systems because social networking systems allow them to create connections with friends and interact with each other. Social networking systems allow users to view other user's profile, organize events, and invite friends to participate in those events.

Social networking systems provide various types of functionality to users to communicate with each other, for example, by using wall posts, private messages, poking, and the like. These communication mechanisms allow users to exchange information with each others. Social networking systems also allow a user to share information with other users, for example, by posting content on the social networking system. A user can post an image, video, or text content so that other users can access it. A user can also make information describing the user's user profile information accessible to other users. This allows other users to learn about the user.

Certain users, for example, celebrities play certain roles that may be different from their private lives. For example, a movie actor or a television celebrity may play a certain role that is popular amongst users. Some celebrities may want to make certain specific aspects of their profile available to other users. As a result, such users make a special web page available via the social networking system that provides the information they want to make available to other users. This type of information made available by a celebrity can be very popular in the social networking system and may be accessed by a large number of users.

However, if certain information is very popular in the social networking system, other users attempt to make fake copies of the information, for example, to attract web traffic. These fake copies are created and maintained by users that may be unrelated to the original user, for example, the original celebrity. As a result, the information provided in these fake copies is often incorrect and may mislead fans of the celebrity. A fan of the celebrity who looks for information would like to find the authentic information provided by the celebrity rather than fake information provided by another user that is unrelated to the celebrity. Social networking systems would like to direct fans or other users to the authentic information provided by a celebrity rather than fake information.

Conventional systems perform manual verification wherein the social networking system directly contacts the celebrity and verifies which information was provided by the celebrity. Since this process is a manual process, it is not scalable since human intervention is required. If the social networking system has a large number of accounts, determining the authentic personas can be a resource intensive process.

A social networking system maintains personas describing entities represented in the social networking system. Each persona is associated with a web page hosted by the social networking system. For example, a celebrity can create a persona describing the celebrity using the social networking system. Users of the social networking system unrelated to a celebrity may also create fake personas purporting to be the celebrity to attract web traffic. The social networking system determines whether a persona is authentic or fake based various connections and interactions between the persona and other entities, possible within and outside of the social networking system. The social networking system may use this determination to direct users to the authentic persona and avoid the fake personas.

In one embodiment, the social networking system determines the authenticity of a persona based on the number or the amount of web traffic directed to a web page in the social networking system that is associated with the persona by one or more external systems. A persona may be determined to be authentic if the web traffic directed to the persona by external systems exceeds a threshold or exceeds the web traffic directed to other personas describing the same entity. In one embodiment, the external system is a search engine, and the traffic is directed to the web page associated with the persona from a search results page of the search engine. The search terms used to obtain the search results page may also be considered in determining the authenticity of the persona (e.g., if the search terms are more related to the persona, the incoming traffic from the search results page may be more indicative of the authenticity of the persona). In another embodiment, the external system is an external web server, and the incoming web traffic is from a web page having a link to the persona. Similarly, the content of the external web page may be considered in determining the authenticity of the persona (e.g., if the web page is more related to the persona, the incoming traffic from the web page may be more indicative of the authenticity of the persona).

The authenticity of a persona may be determined as a weighted aggregate of scores assigned to the external system that direct web traffic to the persona. The weight assigned to the measure of authenticity of the external pages may be determined based on the amount of traffic directed towards the persona that is generated by external systems.

The features and advantages described in this summary and the following detailed description are not all-inclusive. Many additional features and advantages will be apparent to one of ordinary skill in the art in view of the drawings, specification, and claims.

Figure 1:
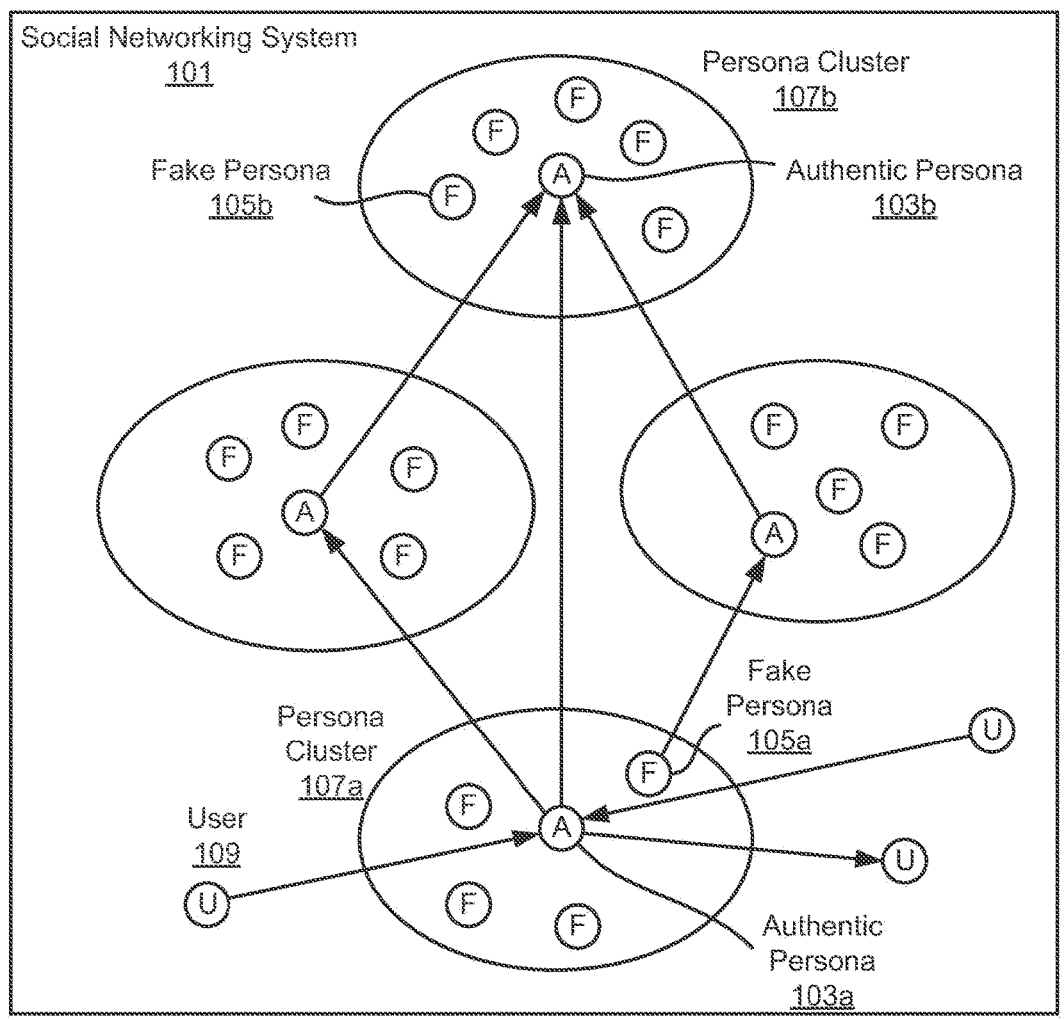
FIG. 1 is a diagram illustrating how authentic personas can be identified using internals links within the social networking system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system can suggest content to users based on the information the user has provided in the user's profile as well as based on the user's likes, comments, or any other type of interactions the user has within the social networking system. Before any type of content can be suggested to a user, the authenticity of the content needs to be verified.

Embodiments of the invention present authenticated personas to users of the social networking system. The term "persona" describes a mechanism of displaying information, for example, a web page displayed in the social networking system in which the administrator or administrators of the persona can post content such as news updates, photos, videos and the like. Personas are usually associated to an artist, band, public figure, business, company, organization, institution, brand, product, or the like. Users of the social networking system may find the content in a persona interesting. Presentation of the personas adds value to the social networking system and the ability of a user to obtain the content associated to the persona will create an incentive for the user to visit the social networking system more frequently. Systems and methods for incorporating organizations into a social network are disclosed in U.S. application Ser. No. 12/200,892, filed Aug. 28, 2008, which is incorporated by reference in its entirety.

Embodiments of the invention present authenticated personas to users based on the information available in their user profiles. The social networking system may determine what content would be the most interesting to a user based on the information the user provided such as favorite artist, favorite movie, etc. Other embodiments may also suggest personas based on a user's friends' preferences since the user may find interesting similar content his friends find interesting.

A social networking system allows users to communicate and interact with other users of the social networking system. A user is typically required to create an account with the social networking system to be able to use the functionality provided by the social networking system. A user is required to authenticate in order to gain access to the user account. Once a user gains access to the user account, the user can view or modify the information stored with the user account as well as interact with other users. The social networking system can store information describing the user, for example, the user profile as well as information uploaded by the user including photos can be stored with the user account.

A user that joins the social networking system can add connections to other users, like other users, and post content in the social networking system. The term "connection" refers to any other user to whom a user has formed a bidirectional connection, association, or relationship via the social networking system (connections are sometimes referred to herein by using the term "friend"). Connections may be added explicitly by a user, for example, the user selecting a particular other user to connect to, or automatically created by the social networking system based on common characteristics of the users (e.g., users who are alumni of the same educational institution).

The term "like" refers to any other user or account to whom a user has formed a unidirectional connection, association or relationship via the social networking system. Likes are usually added explicitly by a user and it can also be recommended by the social networking system based on the information available regarding the user's preferences and likings. After forming a unidirectional connection, the user liking the other user gets automatic updates or feeds from the liked user. Since this connection is unidirectional, the other direction is not true unless the liked user also makes a unidirectional connection with the liking user.

The social networking system allows users to provide information describing the users using web pages called personas. A persona is a web page provided within the social networking system that describes a user, character, or a celebrity. In some embodiments, other entities represented within the social networking systems can have personas, for example, organizations. For example, a conservation organization may create personas for certain aspects of the organization, for example, wild life preservation. The persona created by an entity represented in the social networking system may be accessible to a set of users as determined by the privacy settings associated with the persona. The persona may be publicly accessible to everyone in the social networking system and may also be accessible to users outside the social networking system. For example, a user searching for information using a search engine unrelated to the social networking system may be provided with the web page of the persona if the persona includes information that the user is searching for. However, since personas are typically provided by well known users (e.g., celebrities), other users may also create personas describing these celebrities. These fake personas are provided by users attempting to utilize the fame of these celebrities to their advantage. Furthermore, these personas may include information that is incorrect or misleading. For example, a user may be able to start rumors about a celebrity by mixing real facts with baseless information in a fake persona. The social networking system would prefer to distinguish fake personas from authentic personas, so as to be able to direct users to the authentic information.

For example, a user may have stated in his user profile that he likes a certain artist. The social networking system can suggest the user if he wants to follow the posts from that artist. However, the user would prefer that the social networking system suggest persona that belongs to the artist and is not a fake persona created by another user unrelated to the artist. Similarly, a user may explicitly search for information describing the artist via any search functionality provided by the social networking system or using an external search engine. The user looking for information would prefer that the social networking system provides authentic persona for the artist.

Embodiments of the invention allow authentication of personas and can be applied to verification of any type of web pages or other mechanisms provided by the social networking system to allow users to make their information publicly available via the social networking system. The term "persona" refers to an entity in the social networking system, which may have associated therewith a web page in the social networking system created or managed by any natural person, entity, organization, brand, company, and the like that possesses an account with the social networking system. In some embodiments, a persona can only like or be liked by other users or personas. In other embodiments, a persona can also create a friendship connection with other users or personas.

Users can create a persona that includes information describing the user. For example a popular singer, musician, or actor can create a web page in the social networking system. In this web page (or persona) the user can post comments, thoughts, news, images, videos and the like for other users to follow.

A persona can be administered by one or more users of the social networking system. After creating the persona, the user that created the persona can assign one or more other users to administer the persona. For instance a persona related to a famous artist can be administrated by the artist itself and/or the artist's representatives such as the agent, manager and/or assistant. In some embodiments all administrators have equal privileges. Other embodiments allow for different administrators to have different privileges or roles (e.g. some administrators can only post updates but they cannot form any type of connections with other users or personas).

Once a persona is created in the social networking system, the persona can connect with other users or personas. Similarly other users or personas can connect to the persona. The persona can have incoming interactions such as likes from other users or personas, connection requests by other users or personas, messages from other users or personas, and the like. Also the persona can have outgoing interactions such as likes to other personas, connection request to other users or personas, messages sent to other users or personas, comments on other users or persona's accounts, and the like.

Social networking system may not require a formal verification of identity to create an account in the social networking system. In these social networking systems, any user can create a persona claiming to be someone else. For example a user can create a web page claiming to be a famous singer and populate the user profile with information that is publicly available. Because the information describing the persona is readily available, verifying the content of the persona is not sufficient to verify that the persona belongs to the user it claims to be.

Users of the social networking system are more likely to be interested in personas related to celebrities. The term "celebrity" is used to refer to an artist, band, public figure, business, place, company, organization, institution, brand, product, or the like. As used here a celebrity does not need to be a famous person but instead, it can relate to any content that a large number of users of the social networking system may find interesting or will like to follow.

FIG. 1 is a diagram illustrating how authentic personas can be identified using internals links within the social networking system, in accordance with an embodiment of the invention. FIG. 1 and the other figures use like reference numerals to identify like elements. A letter after a reference numeral, such as "103*a*," indicates that the text refers specifically to the element having that particular reference numeral. A reference numeral in the text without a following letter, such as "103," refers to any or all of the elements in the figures bearing that reference numeral (e.g. "130" in the text refers to reference numerals "103*a*" and/or "103*b*" in the figures).

Because other users can create fake personas 105 for a celebrity, a given celebrity may have several personas associated with him. The set of personas associated with a celebrity is shown as a persona cluster 107. In some embodiments, only one account associated with the celebrity is an authentic persona 103 and all the other personas are fake personas 105. In other embodiments, a celebrity may have more than one authentic personas associated with the celebrity.

A celebrity may be connected with other celebrities via the social networking system. As a result an authentic persona may be associated with users in the social networking system or with other authentic personas. In some embodiments, an authentic persona may also have a connection with a fake persona associated with a different user (i.e. different artist, entity, organization, brand, company, etc). This scenario can occur when an authentic persona is deceived into creating a connection with a fake persona.

Authentic personas may also have connections with users, and may have a large number of followers or subscribers. A user may create a connection with a person by liking the persona, where liking corresponds to a user action performed by the user via the social networking system. The like user action indicates to the social networking system that the user is interested in the entity being liked, for example, the user would like to receive newsfeed or other types of information associated with the entity being liked.

Furthermore, authentic personas or users having an account that is associated with creation of the authentic persona are likely to like, or form a connection, for example, a unidirectional connection with other authentic personas. For example the authentic persona representing DISNEY or a user account associated with creation of the DISNEY persona may like the authentic persona representing DISNEYLAND, WALT DISNEY STUDIO, or DISNEY PIXAR. Therefore, it is highly likely that the personas liked by the DISNEY persona or user accounts associated with DISNEY are also authentic.

It is important to note that the opposite may not be true. If a persona likes several authentic pages, it does not imply that this persona is an authentic persona. Since likes are unidirectional connections, unlike friends or bidirectional connections, they do not require that the liked user or account know the liking user or account. As a result, a persona can like several authentic personas. However this information does not provide an indication that the person is authentic.

System Environment for Determining Authentic Personas

Figure 2:
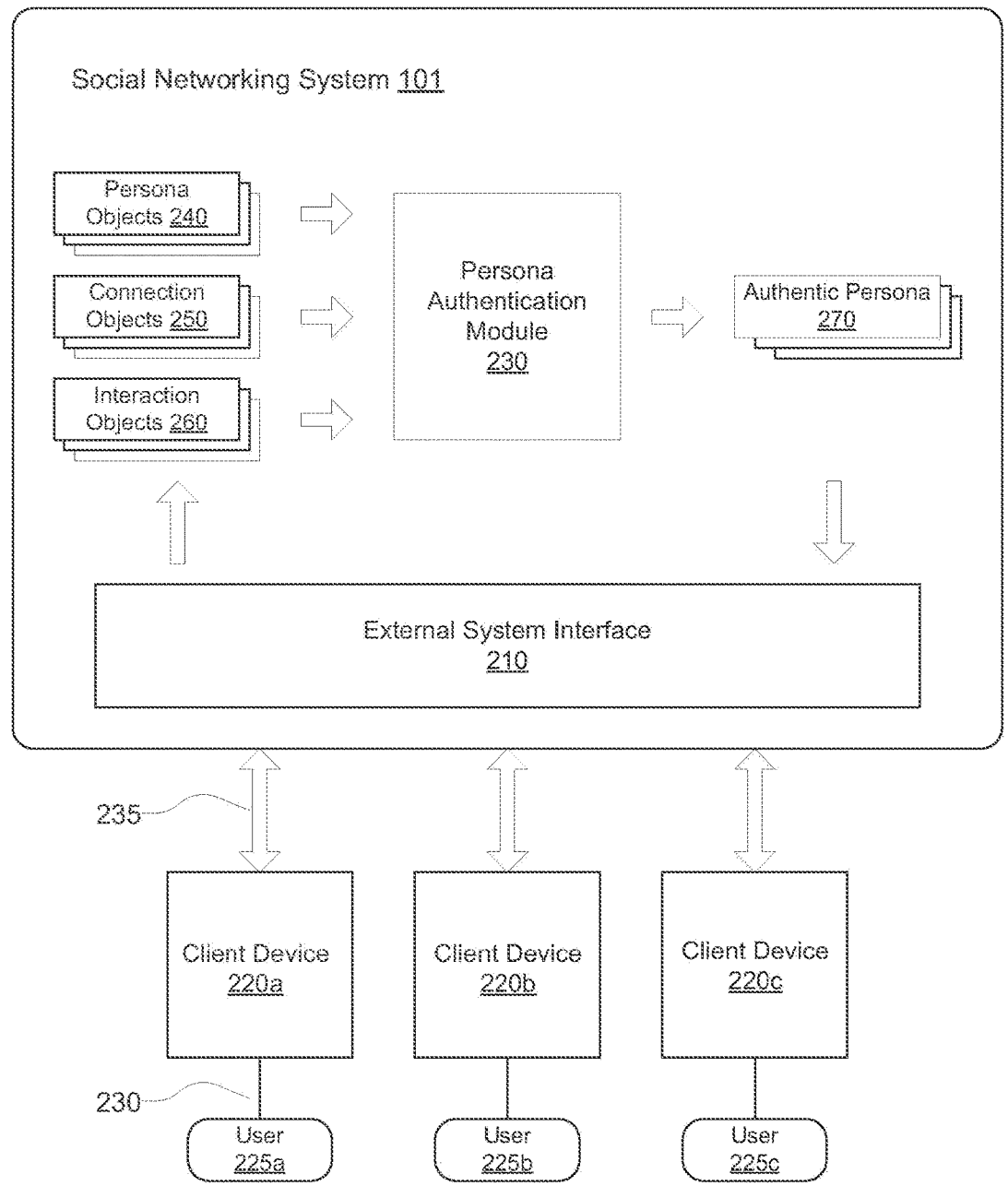
FIG. 2 is a diagram of a system environment for identifying authentic personas in a social networking system, in accordance with an embodiment of the invention.

FIG. 2 is a diagram of a system environment for determining the authenticity of a persona, in accordance with an embodiment of the invention. The users 225 interact with the social networking system 101 using client devices 220. Some embodiments of the system 200 have different and/or other modules than the ones described herein, and the functions can be distributed among the modules in a different manner than described here.

In one embodiment, the client device 220 used by a user 225 for interacting with the social networking system 200 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 220 can be any device having computer functionality, such as a personal digital assistant (PDA), mobile telephone, smartphone, etc.

In some embodiments, the client device 220 may use a web browser as an interface to interact with the social networking system. In other embodiments, specialized application software such as native applications on a mobile device may be used as an interface to interact with the social networking system.

The social networking system 200 offers its users the ability to communicate and interact with other users of the social networking system 200. Users join the social networking system 200 and then add connections to a number of other users of the social networking system 200 to whom they desire to be connected. As used herein, the term "friend" refers to any other user to whom a user has formed a bidirectional connection, association, or relationship via the social networking system 200. The term friend need not require that users to actually be friends in real life, (which would generally be the case when one of the members is a business or other entity); it simply implies a connection in the social networking system 200.

The social networking system 200 maintains different types of objects representing entities, for example, persona objects 240, connection objects 250, interaction objects 260, and authentic persona objects 270. An object may be stored for each instance of the associated entity. A persona object 240 stores information describing a user, which can be a natural person, entity, organization, brand, company, or the like, of the social networking system 200. A connection object 250 stores information describing relations between two users of the social networking system or in general any two entities represented in the social networking system 200. The interaction objects 260 store incoming and outgoing interaction between two accounts in the social networking system 200. The authentic persona objects 270 store authenticated accounts identified by the Persona Authentication Module 230. These objects are further described in detail herein.

Figure 3:
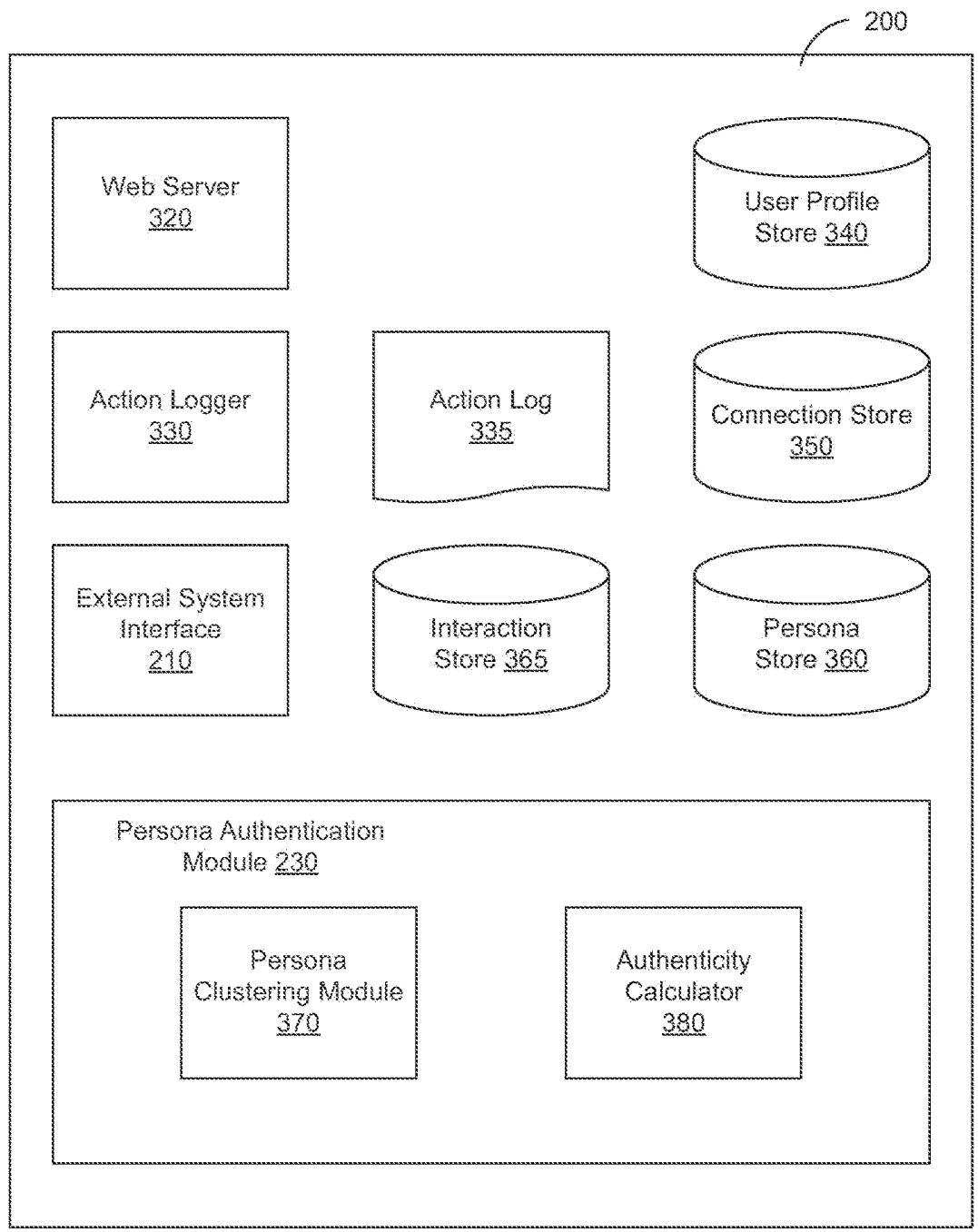
FIG. 3 is a diagram of the system architecture of a social networking system for identifying authentic personas in a social networking system, in accordance with an embodiment of the invention.

The social networking system 200 comprises modules other than those shown in FIG. 2, for example, modules illustrated in FIG. 3 that are further described herein.

Social Networking System Architecture

FIG. 3 is a diagram of system architecture of a social networking system 200 for authenticating personas in a social networking system, in accordance with an embodiment of the invention. The social networking system 200 includes a web server 320, an external system interface 210, an action logger 330, an action log 335, a user profile store 340, a connection store 350, and a persona store 360. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The social networking system 200 allows users to communicate or otherwise interact with each other and access content, as described herein. The social networking system 200 stores user profile objects 240 in the user profile store 340. The information stored in user profile store 340 describes the users of the social networking system 200, including biographic, demographic, and other types of descriptive information, such as work experience, educational history, gender, sexual preferences, hobbies or preferences, location, and the like. The user profile store 340 may also store information provided by the user, for example, images, videos, comments, and status updates. Images of users may be tagged with the identification information of the appropriate users displayed in an image.

Any action that a particular user takes using the social networking system 200 is associated with the user's profile 240, through information maintained in a database or other data repository. Such actions may include, for example, adding a connection to another user, sending a message to another user, reading a message from another user, viewing content associated with another user, attending an event posted by another user, among others. In addition, a number of actions described below in connection with other objects are directed at particular users, so these actions are associated with those users as well.

The connection store 350 stores data describing the connections between different users of the social networking system 200, for example as represented in a connection object 250. The connections are defined by users, allowing users to specify their relationships with other users. For example, the connections allow users to generate relationships with other users that parallel the users' real-life relationships, such as friends, co-workers, partners, and so forth. In some embodiments, the connection specifies a connection type based on the type of relationship, for example, family, or friend, or colleague. Users may select from predefined types of connections, or define their own connection types as needed.

Connections may be added explicitly by a user, for example, the user selecting a particular other user to be a friend, or automatically created by the social networking site based on common characteristics of the users (e.g., users who are alumni of the same educational institution). For example, if Bob and Joe are both connected to each other in the social networking system 200, Bob and Joe, both users, are also each other's friends. The connection between users may be a direct connection; however, some embodiments of a social networking system 200 allow the connection to be indirect via one or more levels of connections.

The persona store 360 stores information describing personas. A persona has a flag describing whether the persona is authentic or fake. A persona has an authentic flag set if the persona has been authenticated by the persona authentication module 230. In some embodiments, persona has an authentic flag set if the persona has been manually authenticated. An initial number of authentic personas that have been authenticated manually are needed to be used as a seed list in order to expand the number of authenticated personas. The personas listed in the persona store 360 are then suggested to users of the social networking system 200 based on the information available in the user profile store 340.

The interaction store 365 stores information describing interactions between two users of the social networking system 101. An interaction object 260 may be defined as a user liking another user; a user commenting on another user's profile, photo, video, or comment; a user creating a connection with another user; of a user sending a message to another user. An interaction can be further classified as an incoming interaction or an outgoing interaction as previously explained.

The web server 320 links the social networking system 200 via a network to one or more client devices 220; the web server 320 serves web pages, as well as other web-related content, such as Flash, XML, and so forth. The web server 320 provides the functionality of receiving and routing messages between the social networking system 200 and the client devices 320. These messages can be instant messages, queued messages (e.g., email), text and SMS (short message service) messages, or any other suitable messaging technique.

The action logger 330 is capable of receiving communications from the web server 320 about user actions on and/or off the social networking system 200. The action logger 330 populates the action log 335 with information about user actions to track them. Any action that a particular user takes with respect to another user is associated with each user's profile, through information maintained in a database or other data repository, such as the action log 335. Such actions may include, for example, adding a connection to the other user, sending a message to the other user, reading a message from the other user, viewing content associated with the other user, attending an event posted by another user, among others. When a user takes an action on the social networking system 200, the action is recorded in an action log 335. In one embodiment, the social networking system 200 maintains the action log 335 as a database of entries.

The Persona Authentication Module 230 performs calculations based on knowledge available in the social networking system and determines the authenticity of a persona in the social networking system. The Persona Authentication Module 230 contains the Persona Clustering Module 370, and the Authenticity calculator 380. Details of the Persona Authentication Module 230 and its components are further described herein.

Determining Authentic Persona Based on Interactions within the Social Networking System In order to allow the persona authentication module 230 to determine if a user account is an authentic persona, the persona authentication module 230 determines which accounts claim to be that persona. To achieve this, the persona clustering module 370 identifies all accounts that are related to a particular persona and creates a persona cluster associated with the particular persona. The persona cluster may contain one or more authentic personas and one or more fake personas.

In an embodiment, the clustering module 370 clusters the personas by matching the information available in each persona. For example, each persona may include various terms and keywords describing the entity or person for whom the persona was created. For example, the persona may include the name of the artist, various contributions of the artist, images and media content associated with the artist. The clustering module 370 may extract these terms from the information available for example by identifying topics available in the text of the description, metadata associated with the content provided on the persona, metadata associated with the web page of the persona, and so on. In an embodiment, the clustering module also analyzes information from the user profile of user accounts associated with the creation of the persona. For example, the user account that was used to create the persona may also provide information describing the artist.

The clustering module 370 may execute clustering techniques, for example, hierarchical clustering techniques, k-means clustering, and so on to cluster the personas. Each cluster corresponds to the personas that describe the same person or entity. Several of the personas in a cluster are likely to be fake and one or more personas are likely to be authentic. The persona authentication module 230 classifies the personas from each cluster as fake and authentic.

After the persona authentication module 230 determines which accounts are associated with a particular persona, the authenticity calculator 380 determines which persona in the persona cluster is an authentic persona. In some embodiments, the authenticity calculator 380 assigns a score to every persona in the persona cluster. Embodiments of the authenticity calculator 380 may select the highest scored persona as the authentic persona and consider all the other accounts as fake personas. Other embodiments may select all the personas that have a score higher than a threshold value as authentic personas and consider all the accounts with a score lower than the threshold as fake personas.

In some embodiments, to determine if an account is an authentic persona, the authenticity calculator 380 first identifies all the connections each persona from the persona cluster has. Then the authenticity calculator 380 determines how many of those connections come from an authentic persona. Then the authenticity calculator 380 assigns a score to each connection.

The authenticity score S of a persona may be determined using equation (1) as a weighted sum of authenticity scores of entities that have connections to the persona. The entities having a connection to the persona may be other personas, users, or entities represented in the social networking system. In an embodiment, the persona is associated with a user account of the user for whom the persona is created. In this embodiment, the authenticity score of the persona also considers the incoming connections to the user account, for example, connections that were initiated by other users. Assuming there are N entities that created a connection with the persona, the $i^{th}$ entity has score $S_i$. Equation (1) determines a weighted summation of all these entities such that the score $S_i$ of the $i^{th}$ entity is weighted by a value $w_i$. The weight associated with the entity may be determined by various factors including interactions associated the entity and the persona.

$$S = \sum_{i=1}^{N} w_i \times S_i \qquad (1)$$

Note that the equation (1) provides a recursive definition of the score since the score of the $i^{th}$ entity that created a connection to the persona is further determined by using equation (1). Accordingly, the authenticity of the $i^{th}$ entity is determined using authenticity scores of other entities that created a connection to the $i^{th}$ entity, and so on. The recursion may be stopped for an entity if the authenticity of the entity is determined manually. For example, a fixed score value is assigned to an entity that has been manually verified to be authentic. In other embodiments, other mechanisms for verifying authenticity can be used for example, by receiving authentication information from the user creating the persona to ensure that the person is created by an authentic source. The authentication information may comprise information that is expected to be available with an authentic source, for example, a login and password, or requiring the user to solve challenge questions.

In an embodiment, the score values can be determined by performing a graph traversal starting from a set of seed personas or entities that have been manually verified to be authentic. The graph traversal may have to be performed multiple times, so as to iteratively improve the authenticity scores of the personas or entities in each iteration. The iterations may be stopped once an aggregate measure based on the authenticity scores of all the entities shows only a marginal improvement compared to previous iteration.

In one embodiment, the authenticity calculator assigns greater weights to connections created by other authentic personas and lower weights to connections created by the user account of the persona being authenticated. This is done because it is more important to know if other authentic personas are recognizing the persona being authenticated and not the other way around.

In an embodiment, the authenticity calculator 380 determines the authenticity score of each entity based on factors defining an impact of the entity. The impact of an entity is based on how popular the entity is. The impact of an entity may be determined based on the popularity of the entity that is being described in an authentic persona. In particular, the impact of an entity may be determined based on how popular an authentic persona of the entity is. The impact factor may be based on the total number of likes directed to a persona or the total number of likes directed to the entity. In other embodiments, the impact factor is based on the number of users talking about the persona or commenting about the persona. The impact factor may be based on number of incoming connections to the entity or an authentic persona of the entity. In general, the impact of an entity is based on how popular is the celebrity behind the person or the entity. If a very popular celebrity creates a link with the persona, the persona is very likely to be authentic. The fact that a celebrity created a link to the persona can be considered as an endorsement of the persona by the celebrity.

In an embodiment, the authenticity calculator 380 considers connections initiated or created by the persona, for example, connections or links created by the persona to other persona or user so long as there is at least some significant communication initiated by the other persona or the entity. For example, responsive to the connection being created by the persona, the other entity may have send a message to persona or liked the persona or endorsed the persona. In this situation although the connection was not initiated by the other entity, the other entity authenticated the persona by a follow-up communication.

In an embodiment, the authenticity calculator 380 weighs the authenticity score of each entity based on a rate of interactions between the entity and the persona. For example, if an authentic persona performed a one time communication with the persona, the weight of the authenticity score of the entity in the calculation of the authenticity of the persona may be small. On the other hand, if an authentic entity made several comments on the persona or retrived information from the persona multiple times, a higher weight is assigned to the authenticity score of the entity.

Other embodiments determine the authenticity of a persona based on the number of likes that persona has. After the persona clustering module 370 finds all the personas related to a user, the authenticity calculator identifies all the likes each persona from the persona cluster has and assigns scores to those likes. In one embodiment, the authenticity calculator assigns higher scores to likes from authentic personas and lower scores to likes from all other users. Other embodiments only assign scores to likes form authentic personas and do not take into account likes from all other users that are not listed in the authentic persona store. In some embodiment, the likes are weighed based on the authentic personas' impact factor as described above. After all likes have been scored, each persona form the persona cluster receives a likes-score and the authenticity calculator determines which persona is most likely to be the authentic persona (or personas) based on that score.

Some embodiments also take into account the incoming interactions with other authentic personas. For example if an authentic persona frequently posts comments on a persona, the persona is likely to be also an authentic persona. The authenticity calculator 380 assigns a score to every incoming interaction a persona has. The score can be dependent on the type of interaction, the impact factor of the authentic persona generating the interaction, etc. Then the authenticity calculator 380 calculates an overall score for all the incoming interactions a persona has and determines which accounts are most likely to be authentic.

Figure 4:
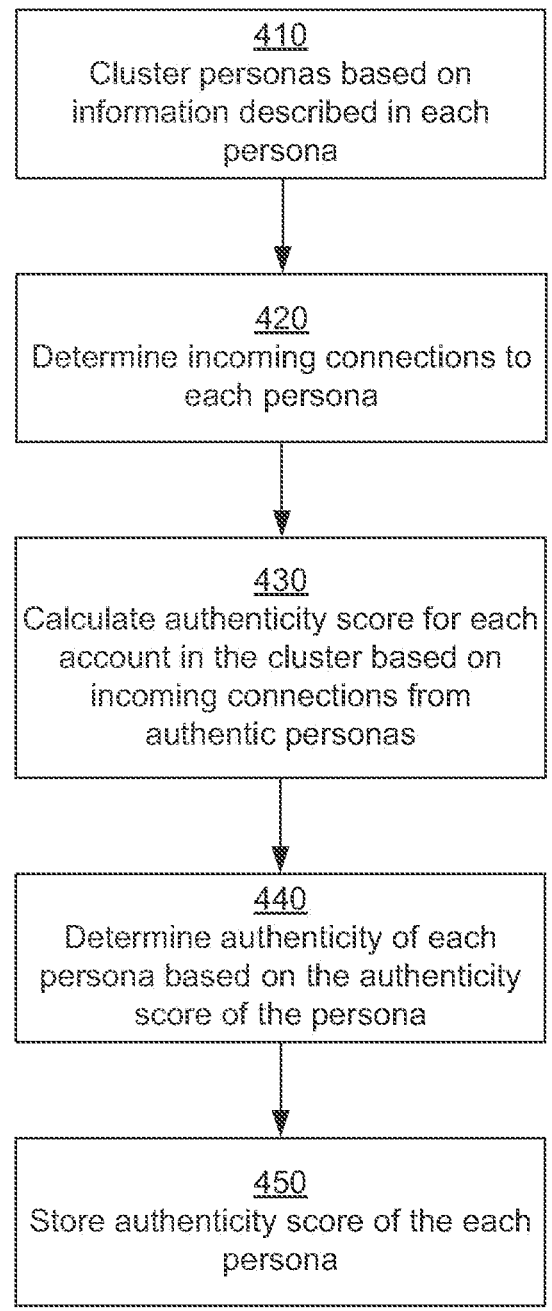
FIG. 4 is a flowchart of a process for identifying authentic personas in a social networking system using internal links within the social networking system, in accordance with one embodiment of the invention.

FIG. 4 shows a flowchart of a process for identifying authentic personas in a social networking system, in accordance with an embodiment of the invention. The persona clustering module 370 first clusters 410 the available personas to determine which clusters of personas are describing the same user or entity. The authenticity calculator 380 determines 420 entities that have connections with personas in the persona cluster. The authenticity calculator 380 calculates 430 an authenticity score for each persona in the persona cluster based on the incoming connections of the persona with other authentic personas. The authenticity calculator 380 determines 440 authenticity of each persona based on the authenticity scores of each persona. The results are reported and the authenticity score along with information indicating whether the persona is authentic or not is stored 450 in the persona store 360.

Determining Authentic Persona Based on External Systems

In an embodiment, the authenticity of a persona is determined based on external systems, for example, search engines unrelated to the social networking system or web servers unrelated to the social networking system directing web traffic to the persona by maintain a link to the persona. For example, a search engine may direct web traffic to the persona. An external system such as a web server may host a web page having a link to the persona thereby generating web traffic to the web page of the persona. For example, a user may view retrieve the web page from the web server and then click on the link to the web page of the persona causing the person to retrieve the persona's web page. The authenticity of the persona may be determined using the web traffic generated by external systems that is directed towards the persona.

Figure 5:
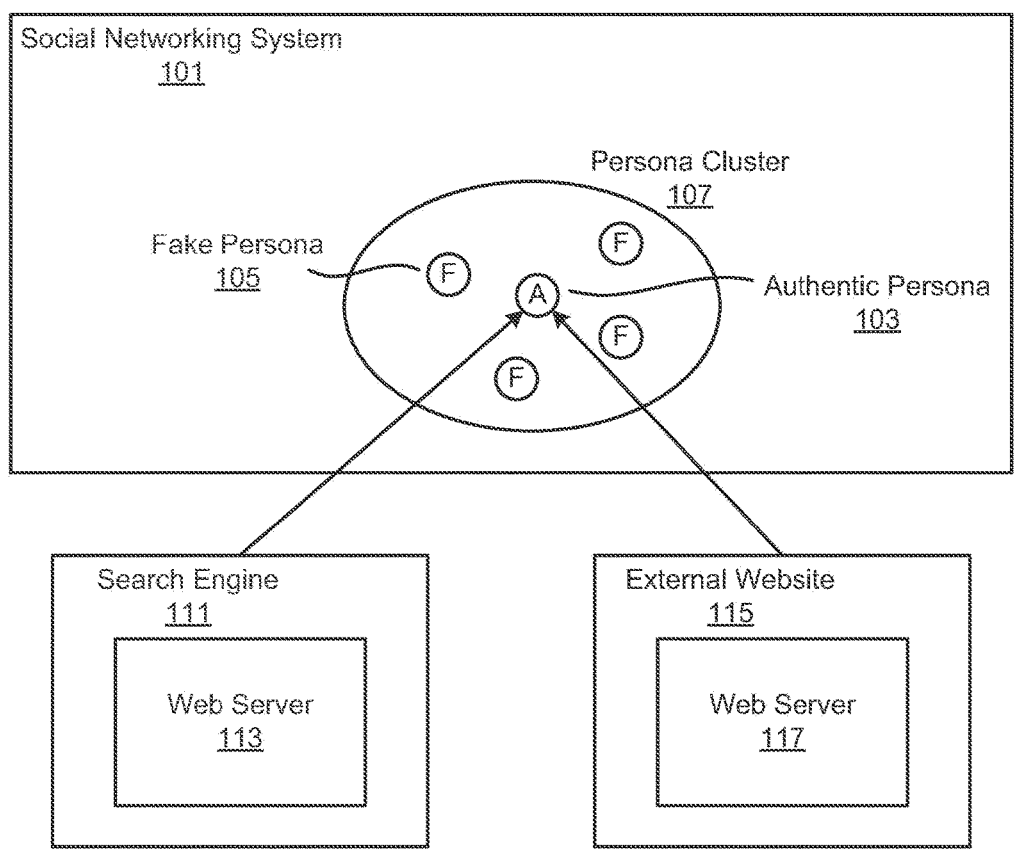
FIG. 5 is a diagram illustrating how authentic personas can be identified using external links from external systems outside the social networking system, in accordance with an embodiment of the invention.

FIG. 5 illustrates how authenticity of a persona can be determined using web traffic from external systems, in accordance with an embodiment of the invention. Oftentimes celebrities are described in external system, for example, external web pages 115 hosted by web servers unrelated to the social networking system. For example, a web server hosting a website providing news may include a link to the persona describing the web page, for example, CNN.COM or ABCNEWS.COM. A web server is also referred to as a website herein. An external website 115 refers to a web page that is not displayed by the social networking system. Usually these off-site web pages have a link, that points to a persona in the social networking system. Some external websites 115 have a "find us on facebook" or "like us on facebook" link that may point to the persona. If the external website is a reliable website, the fact that a webpage of the website includes a link to the persona indicates that it is highly likely that the person is an authentic persona. In an embodiment, the measure of authenticity of each persona comprises a weighted aggregate value of scores associated with each external system directing web traffic to the persona, the score of an external system determined using information describing the external system. The score of an external system may be determined by information received from experts, for example, by an expert opinion. The score of the external system can be determined based on a measure of popularity of the external system. The score of the external system can be determined by the amount of web traffic that is directed to the external system. The social networking system may receive information describing traffic to the external website using a web analytic tool. This allows the social networking system to eliminate fake websites that may be generated to direct web traffic to fake personas.

An authentic persona is likely to be ranked higher than fake personas by search engines 111. As a result, authentic personas experience higher web traffic than fake personas. Therefore by monitoring the incoming web traffic that is originated from search engines, the social networking system can predict which personas are authentic.

Some embodiments determine the number of web pages that points to a persona or that contains a link or hyperlink that directs users to the persona. The authenticity calculator 380 then assigns a score to every link and computes an overall score for a persona based on the number of links directed to the persona and the score of each link. In one embodiment, the link score is proportional to the importance of the web page that contains the link. The importance of a web page may be determined based on the number of hits (or unique hits) a web page has or the number of other web pages that link to the first web page. The authenticity calculator 380 determines which persona (or personas) is most likely to be an authentic persona based on the assigned score.

In an embodiment, an equation similar to equation (1) described herein is used to determine an authenticity score S of a persona. There are N external system identified as directing web traffic to the persona. Each of the N external system has an authenticity score $P_i$. The authenticity score of an external system is determined based on various factors including, popularity of the external system, amount of traffic that is directed in the internet to the external system, a score assigned to the external system based on expert opinion, and so on. The score of each external system is weighted by a factor $v_i$. The weight associated with each external system may be determined based on the amount of traffic generated by the external system that is directed towards the persona.

$$S = \sum_{i=1}^{N} v_i \times P_i \quad (1)$$

In an embodiment, the weight assigned to the external system is determined based on the type of interaction that the user originally had with the external system that directed the user to the persona. For example, if the external system is a search engine, the weight assigned to the search engine may depend on the search terms that a user used that matched the persona. The social networking system may receive information describing the search terms used by a user of the search engine that caused the search engine to return the persona as a result of the user's search. The social networking system may receive other information describing the search engine, for example, the method used by the search engine to rank the search results. The information may be received by the search information based on a protocol used to communicate between the social networking system and the search engine. If a user was explicitly looking for a celebrity described in the persona, the corresponding web traffic from the search engine is weighted high. In contrast, if a user was looking for some other information and clicked on the persona, the corresponding web traffic from the search engine is weighted low. This is so because the user reached the persona after performing a search for some terms unrelated to the persona and the fact that the user reached the persona can be considered accidental. For example, there may be other information that is incidental to the celebrity being described in the persona that may cause a search engine to return the persona. Web traffic directed to the persona based on searches that do not correspond to a user looking for the celebrity described in the persona are weighted low. If the more external systems is a web server that serves a web page that links to the persona, the measure of authenticity of the persona may be based on a comparison of the information describing the entity with the information of the web page that links to the persona. If the more external systems is a web server that serves a web page that links to the persona, the measure of authenticity based on the web server is higher if the web page linking to the persona comprises information identifying the entity described by the persona. In other words, the measure of authenticity of the persona is based the relatedness of the web page linking to the persona with the information describing the entity or celebrity in the persona.

Embodiments use a web crawler to search for web pages that contain links to personas in the social networking system. The web crawler browses the network, for example, the Internet and searches for links that point to the social networking system. Other embodiments, monitors the incoming web traffic coming from search engines such as GOOGLE, YAHOO!, BING, ASK.COM, and the like. Authentic web pages and authentic personas are commonly ranked high by search engines. As a result, they are ranked higher in search results. As a result, the authenticity calculator 380 can determine the amount of web traffic coming from a search engine for every persona in a persona cluster 107 and assign a score to it. The score can be a factor of the traffic density (e.g. number of redirects per day), the popularity of the search engine (i.e. assign higher weight to most popular search engines such as GOOGLE and lower weight to less popular search engines such as AOL or ASK.COM), the method the search engine uses to rank web pages, and the like. Then the authenticity calculator computes an overall score for each persona in the persona cluster 107 and determines which persona is most likely to be an authentic persona based on this score.

Figure 6:
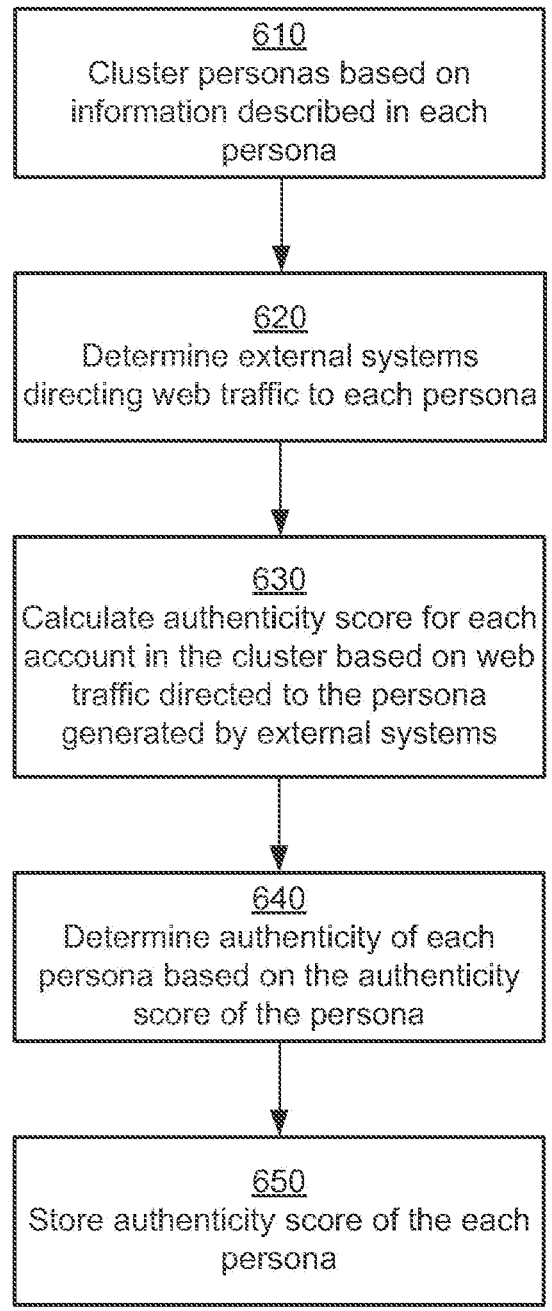
FIG. 6 is a flowchart of a process for identifying authentic personas in a social networking system using external links from external systems, in accordance with an embodiment of the invention.

FIG. 6 shows a flowchart of a process for identifying authentic personas in a social networking system based on web traffic generated by external systems, in accordance with an embodiment of the invention. The persona clustering module 370 first clusters 610 the available personas to determine which clusters of personas are describing the same user or entity. The authenticity calculator 380 determines 620 external systems that direct web traffic to each persona. The authenticity calculator 380 calculates 630 an authenticity score for each persona in the persona cluster based on the web traffic generated by the external systems. The authenticity calculator 380 determines 640 authenticity of each persona based on the authenticity scores of each persona. The results are reported and the authenticity score along with information indicating whether the persona is authentic or not is stored 650 in the persona store 360.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
    maintaining, by a social networking system, a plurality of personas describing an entity in the social networking system, each persona associated with a page provided by the social networking system;
    receiving, by a social networking system, web traffic directed to a page associated with a persona in the plurality of personas by a search engine, the web traffic generated as a result of one or more search terms provided to the search engine;
    receiving, by the social networking system from the search engine, information describing the one or more search terms that generated the web traffic;
    determining a measure of authenticity of each persona from the plurality of personas based on a degree of match between the one or more search terms that generated the web traffic and information describing the persona;
    determining that the persona representing the entity is authentic based on a comparison involving the determined measure of authenticity of each persona; and
    storing information indicating the authenticity of the persona.

2. The computer-implemented method of claim 1, wherein the web traffic directed to the page from the search engine is weighted higher for a higher if the degree of match between the one or more search terms and comprise the entity described by the information describing the persona in comparison to a lower degree of match between the one or more search terms and the information describing the persona.

3. The computer-implemented method of claim 1, further comprising:
    determining the measure of authenticity of the persona based on a popularity of the search engine.

4. The computer-implemented method of claim 1, further comprising:
    determining the measure of authenticity of the persona based on an amount of traffic directed to the search engine.

5. The computer-implemented method of claim 1, further comprising:
    determining the measure of authenticity of the persona based on an expert opinion.

6. The computer-implemented method of claim 1, wherein determining that the persona representing the entity is authentic based on the comparison comprises:
    comparing the amount of web traffic being directed to the page associated with the persona by the search engine to an amount of web traffic being directed to other personas from the plurality of personas.

7. The computer-implemented method of claim 1, wherein determining that the persona representing the entity is authentic based on the comparison comprises:
    comparing the amount of web traffic being directed to the page associated with the persona by the search engine to a threshold amount of web traffic.

8. The computer-implemented method of claim 1, wherein storing information indicating the authenticity of the persona further comprises:
    determining an authenticity score for the persona based on the amount of web traffic being directed to the page associated with the persona by the search engine.

9. A non-transitory computer-readable storage medium comprising instructions which, when executed by a processor, cause the processor to perform steps comprising:
    maintaining, by a social networking system, a plurality of personas describing an entity in the social networking system, each persona associated with a page provided by the social networking system;
    receiving, by a social networking system, web traffic directed to a page associated with a persona in the plurality of personas by a search engine, the web traffic generated as a result of one or more search terms provided to the search engine;

receiving, by the social networking system from the search engine, information describing the one or more search terms that generated the web traffic;

determining a measure of authenticity of each persona from the plurality of personas based on a degree of match between the one or more search terms that generated the amount of web traffic and information describing the persona;

determining that the persona representing the entity is authentic based on a comparison involving the determined measure of authenticity of each persona; and storing information indicating the authenticity of the persona.

10. The non-transitory computer-readable storage medium of claim 9, wherein the web traffic directed to the page from the search engine is weighted higher for a higher degree of match between the one or more search terms and the information describing the persona in comparison to a lower degree of match between the one or more search terms and the information describing the persona.

11. The non-transitory computer-readable storage medium of claim 9, further comprising instructions which, when executed by the processor, causes the processor to perform the steps comprising:
determining the measure of authenticity of the persona based on a popularity of the search engine.

12. The non-transitory computer-readable storage medium of claim 9, further comprising instructions which, when executed by the processor, cause the processor to perform the steps comprising:
determining the measure of authenticity of the persona based on an amount of traffic directed to the search engine.

13. The non-transitory computer-readable storage medium of claim 9, further comprising instructions which, when executed by the processor, cause the processor to perform the steps comprising:
determining the measure of authenticity of the persona based on an expert opinion.

14. The non-transitory computer-readable storage medium of claim 9, wherein the instructions that cause the processor to perform the step of determining that the persona representing the entity is authentic based on the comparison further comprises instructions which, when executed by the processor, cause the processor to perform the steps comprising:
comparing the amount of web traffic being directed to the page associated with the persona by the search engine to an amount of web traffic being directed to other pages associated with other personas from the plurality of personas.

15. The non-transitory computer-readable storage medium of claim 9 wherein the instructions that cause the processor to perform the step of determining that the persona representing the entity is authentic based on the comparison further comprises instructions which, when executed by the processor, cause the processor to perform the steps comprising:
comparing the amount of web traffic being directed to the page associated with the persona to a threshold amount of web traffic.

16. The non-transitory computer-readable storage medium of claim 9, wherein the instructions that cause the processor to perform the step of storing information indicating the authenticity of the persona further comprises instructions which, when executed by the processor, cause the processor to perform the steps comprising:
determining an authenticity score for the persona based on the amount of web traffic being directed to the page associated with the persona by the search engine.

17. The method of claim 1, further comprising:
receiving, by the social networking system from each of one or more additional search engines, information describing one or more additional search terms that generated web traffic directed to the page associated with the persona,
wherein the measure of authenticity of the persona is further determined based on a degree of match between each of the one or more additional search terms received from each of the one or more additional search engines and the persona.

18. The non-transitory computer-readable storage medium of claim 9, further comprising instructions which, when executed by the processor, causes the processor to perform the steps comprising:
receiving, by the social networking system from each of one or more additional search engines, information describing one or more additional search terms that generated web traffic directed to the page associated with the persona,
wherein the measure of authenticity of the persona is further determined based on a degree of match between each of the one or more additional search terms received from each of the one or more additional search engines and the persona.

* * * * *

UNITED STATES PATENT AND TRADEMARK OFFICE
CERTIFICATE OF CORRECTION

PATENT NO. : 9,979,714 B2
APPLICATION NO. : 15/237499
DATED : May 22, 2018
INVENTOR(S) : Giridhar Rajaram et al.

It is certified that error appears in the above-identified patent and that said Letters Patent is hereby corrected as shown below:

Column 15, Line 66, after "receiving, by" delete "a" and insert -- the --.
Column 16, Line 20, after "for a higher" delete "if the".
Column 16, Line 21-22, after "terms and" delete "comprise the entity described by".
Column 16, Line 65, after "receiving by," delete "a" and insert -- the --.
Column 17, Line 25, after "executed by the processor," delete "causes" and insert -- cause --.
Column 18, Line 5, after "claim 9" insert -- , --.
Column 18, Line 12, after "persona" insert -- by the search engine --.
Column 18, Line 38, after "executed by the processor," delete "causes" and insert -- cause --.

Signed and Sealed this
Twenty-third Day of October, 2018

Andrei Iancu
*Director of the United States Patent and Trademark Office*